United States Patent [19]
Sreenivas et al.

[11] Patent Number: 6,067,090
[45] Date of Patent: May 23, 2000

[54] DATA SKEW MANAGEMENT OF MULTIPLE 3-D GRAPHIC OPERAND REQUESTS

[75] Inventors: Aditya Sreenivas, Eldorado Hills; Kam Leung, El Dorado Hills; Sajjad Zaidi, Folsom; Brian Rauchfuss, Rancho Cordova, all of Calif.; John Austin Carey, Winter Springs, Fla.; R. Scott Hartog; Michael Mantor, both of Orlando, Fla.

[73] Assignee: Intel Corporation, Santa Clara, Calif.

[21] Appl. No.: 09/018,773

[22] Filed: Feb. 4, 1998

[51] Int. Cl.[7] ........................................ G06F 15/00
[52] U.S. Cl. .............................................. 345/431
[58] Field of Search .................... 345/419, 425, 345/427, 431, 432

[56] References Cited

U.S. PATENT DOCUMENTS 4,463,380  7/1984  Hooks, Jr. .......................... 358/160
5,023,725  6/1991  McCutchen ........................ 358/231
5,446,833  8/1995  Miller et al. ....................... 345/425

*Primary Examiner*—Phu K. Nguyen
*Attorney, Agent, or Firm*—Blakely, Sokoloff, Taylor & Zafman LLP

[57] ABSTRACT

A pipeline apparatus for processing 3D graphics data will be described. The pipeline apparatus includes a first request memory to fetch information corresponding to a texture operand. A second request memory fetches information responding to a color operand and Z operand. A control circuit coordinates data flow from the first request memory and the second request memory into a memory channel by preventing the number of requests from the first request memory from exceeding by a predetermined number, the number of requests from the second request memory. By properly coordinating the data flow, deadlock of a data fetching pipeline is avoided.

15 Claims, 5 Drawing Sheets

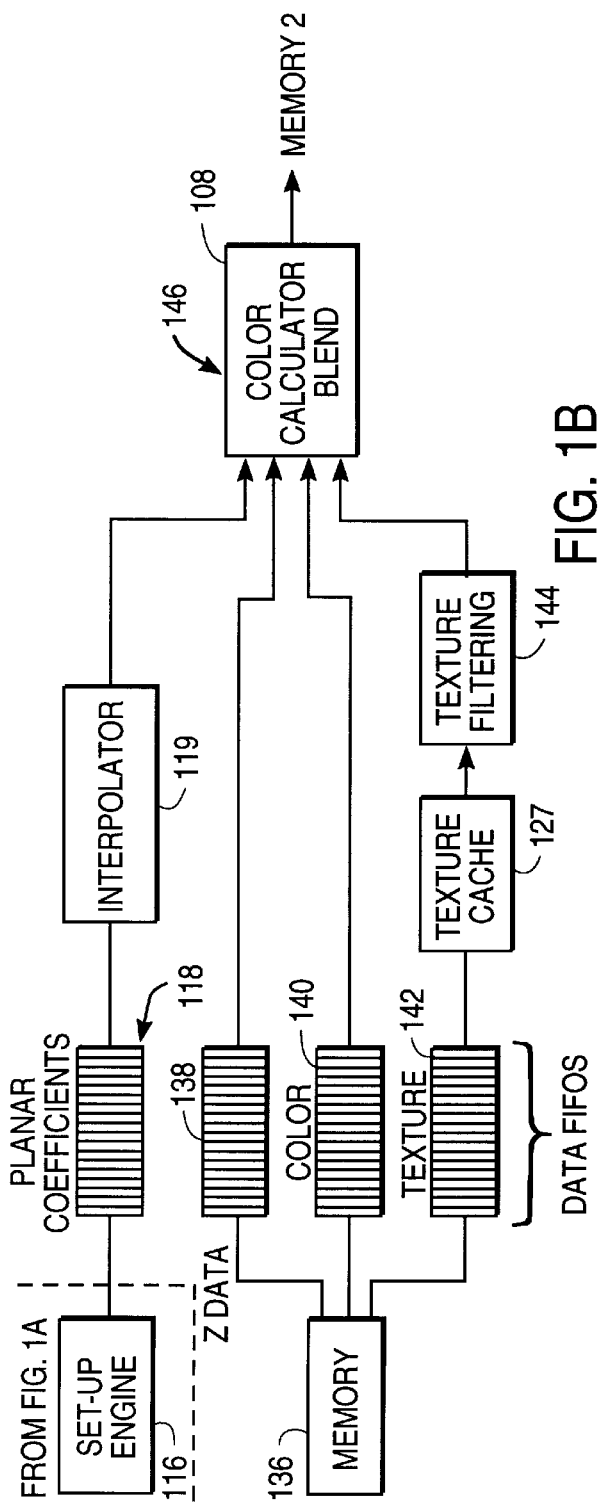
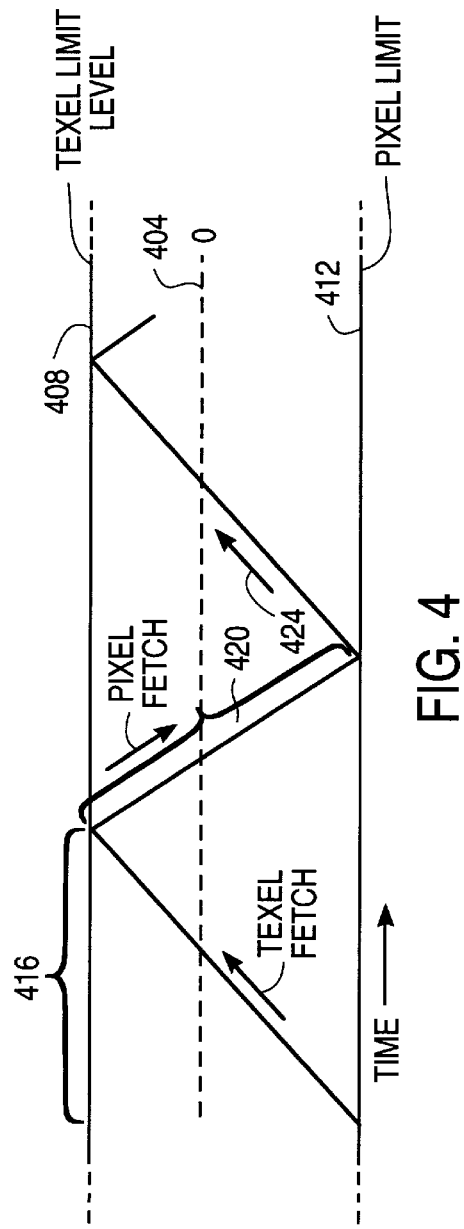

DATA SKEW MANAGEMENT OF MULTIPLE 3-D GRAPHIC OPERAND REQUESTS

BACKGROUND OF THE INVENTION (1). Field of the Invention

The present invention relates to control of data for the generation of three-dimensional images. Specifically, the following discloses a method and circuit for sequencing into a single channel three types of data: texture, color and Z data, for use in generating a three dimensional ("3-D") image.

(2). Related Art

As computers become more powerful, the generation of complex three-dimensional (3-D) graphics images becomes possible. Multiple polygons are typically used to render a 3-D graphics image. The generation of each of the multiple polygons involves combining four categories of information. These four categories are visibility, texture mapping, blending and shading. In order to generate the four categories, three units of data are needed from memory because shading, the process of converting vertex lighting data into pixel lighting data can be computed by many 3-D graphics engines. Thus, typically, only three fetches of pixel data from memory are required.

In order to generate the remaining three categories of information (visibility, texture mapping and blending), three units of data are needed. Computing visibility requires Z coordinate data stored in a Z buffer in memory. Texture mapping requires texture data retrieved from memory. Texture mapping generates a simulation of a two dimensional texture surface which can be applied to the surface of a polygon. Color blending, the process of blending destination colors, requires corresponding color data from memory. Thus, a graphics processor typically needs to execute three fetches to obtain the three units of 3-D graphics data: Z data, texture data, and color data.

In prior art systems, three streams of data or three channels are used to transfer the three units of 3-D graphics data from a memory or source, to a destination, such as a graphics controller. The use of three channels to transfer data requires extra data paths or wires which use up chip or board space increasing the cost of graphics card. In some large graphics card designs, buffers store the three units of data so that the graphics card can obtain the necessary data as needed. However, large buffers also increase the cost of the graphics card.

Thus, it would be desirable to find a more efficient way of transferring the three units of data to a graphics card or processor as needed.

BRIEF SUMMARY OF THE INVENTION

A system for transferring three-dimensional data is described. The system includes a first memory device to store color data, each unit of color data corresponding to a pixel in a plurality of pixels. The system also includes a second memory device to store texture data, each unit of texture data corresponding to a pixel in a plurality of pixels. A skew control circuit is used to control the data flow from the first memory device and the second memory device into a single pipeline. The skew control circuit maintains the skew of color data with respect to texture data within predetermined skew limits.

BRIEF DESCRIPTION OF THE DRAWINGS

FIG. 4 illustrates at a conceptual level the operation of the TSI circuit.

DETAILED DESCRIPTION OF THE INVENTION

In the following description, a processing circuit for processing three-dimensional images will be described. In the circuit, a single channel is used to transfer three data units, one unit each of three types of 3-D data including color, Z and texture data. The data is sequenced to allow a small buffer to store the data. A processor processes the data almost as the data is received. The processor converts the three units of data into a 3-D rendition of an image. In one embodiment the processor may be implemented within a graphics processing chip. An example of such a chip is an Intel® 740 graphics chip. The graphics processing chip processes three-dimensional (3-D) graphical data and converts it into a format suitable for an output device such as a computer monitor, printer or other display.

In the following description, schematics and block diagrams will be used to show implementations of a processing circuit. The processing circuit will include multiplexers and counters used to implement the processing circuit. Such details are included to facilitate an understanding of the invention but should not be interpreted to limit the invention unless specifically described in the claims that follow the specification.

Figure 1A:
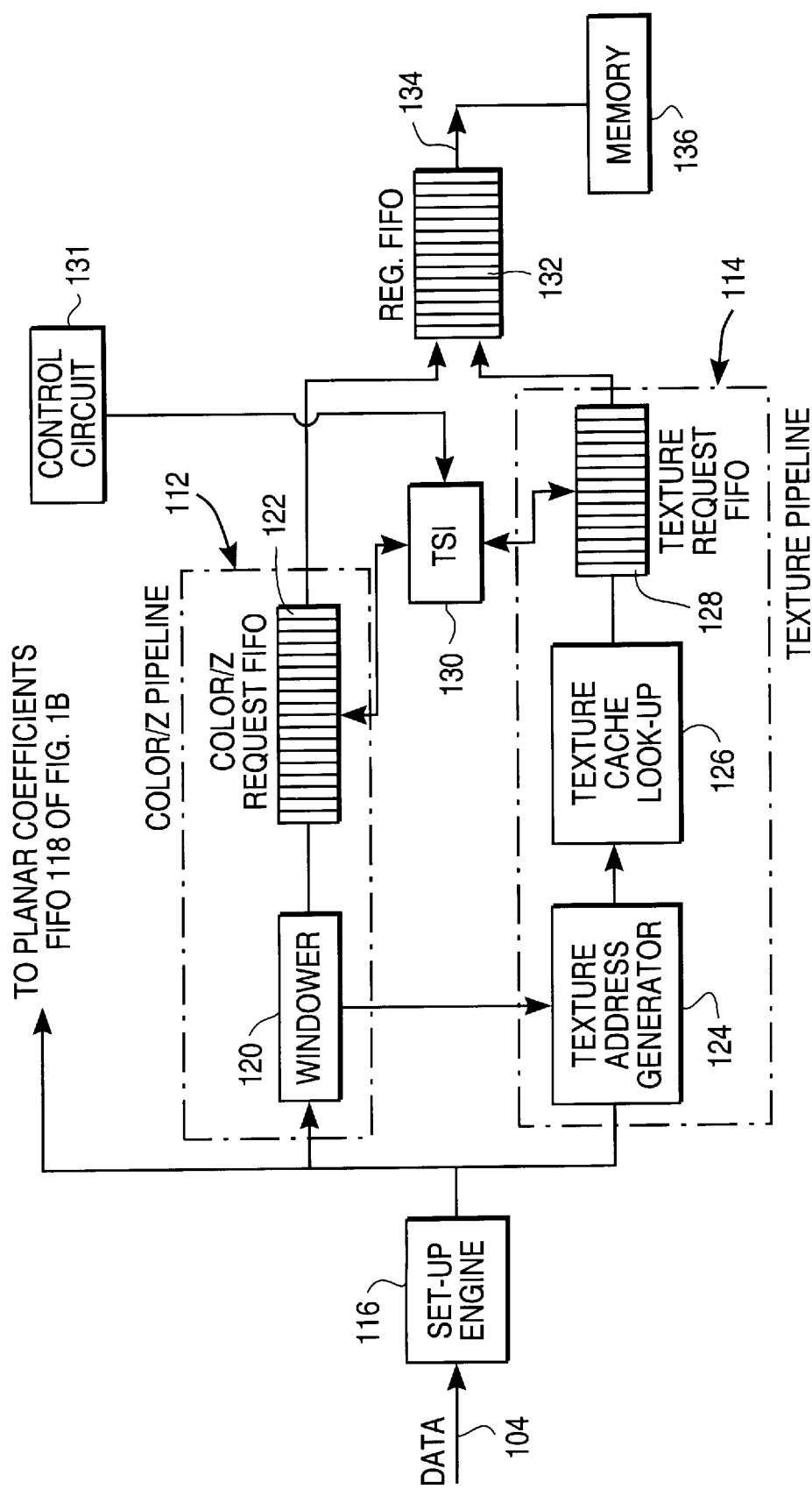
FIG. 1 illustrates a high level block diagram view of a system used to implement the current invention.
FIG. 1b illustrates the routing of signals from a memory device to a processing device such as a color calculator blender.

FIG. 1 illustrates a high level block diagram view of a system used to implement the current invention. The "chain of circuit elements" which connects and processes raw data arriving from an input 104 of FIG. 1A to the output of the system 108 of FIG. 1B is called a "pipeline". Within the pipeline are "sub-pipelines" such as color/Z pipeline 112 and texture pipeline 114. Each sub-pipeline carries and processes a particular data type or types.

A data source (not shown) transmits three-dimensional graphical data or "triangle data" to input 104 of the pipeline. The incoming data is processed in a setup engine 116 which parses the data to generate edge and planar equations. Edge equations are equations of straight lines which define the edge of the triangle data. Planar equations are three-dimensional equations which define changes of color with respect to the x and y dimensions.

Setup engine 116 provides data to a windower circuit 120. Windower circuit 120 identifies regions of an image for processing. The windower uses the edge equation to determine regions including spans of 16 pixels, four in the x and four in the y directions, that are inside the triangle. The windower circuit 120 outputs appropriate color data and "Z" data for selected pixels to a color/Z request FIFO 122 for further storage and processing. For purposes of this illustration, color/Z request FIFO 122 includes a first in and first out memory device as well as supporting logic circuits. The contents of the color/Z request FIFO 122 will be further described in more detail in subsequent figures and description.

In an illustrated embodiment, each pixel of a 3D image corresponds to one color operand and one Z operand. Thus, it is not difficult to flow Z operands and color operands through a pipeline and maintain approximate correspondence to pixels being processed. The correspondence of one Z operand and one color operand for each pixel makes it unnecessary to separate these two operands into separate pipelines for skew control purposes, although in other embodiments, it is contemplated that separate pipelines for color operands and Z operands may become necessary. For purposes of this invention, skew will be defined to be the difference computed by subtracting the number of operands or data units of a first data type transmitted to a destination such as regular FIFO 132 from the number of pixels corresponding to second operands or data units of a second data type transmitted to the same destination at a particular point in time. Thus, in the preferred embodiment, if 5 color data units corresponding to 5 pixels have been transmitted and 21 texture data units corresponding to 8 pixels have been transmitted, the data skew is 8–5 or 3.

A texture address generator 124 in the texture pipeline 114 receives the output of the windower circuit 120 and the setup engine 116. The texture address generator 124 generates addresses corresponding to texture operands for a selected pixel. Each pixel is typically associated with several texture operators unlike color and Z operands which typically have a one-to-one correspondence with each pixel. Thus, the number of texture operands does not correspond to the number of color operands nor Z operands on a one to one basis.

In order to generate address data, texture address generator 124 must typically expand and interpolate data to generate the complete addresses of texture operands corresponding to each pixel. This information is forwarded to a texture cache lookup circuit 126. If texture cache lookup circuit 126 indicates a miss in the texture cache 127 of FIG. 1B, the texture cache lookup circuit 126 transfers the texture addresses with other appropriate information to a texture request FIFO 128. If texture cache lookup circuit 126 indicates a hit in the texture cache 127, the texture data is stored in the texture cache and no texture request is needed for the corresponding pixel. Texture request FIFO 128 includes a first input first output (FIFO) memory and logic circuitry to process the texture related information for skew control purposes.

A skew control circuit such as a TSI (texture stream interface) circuit 130 receives pixel count information from both the color/Z request FIFO 122 and the texture request FIFO 128. The TSI uses the information to generate control signals which control the output of both the color/Z request FIFO 122 and the texture request FIFO 128. The TSI circuit 130 maintains the "skew" of the data output by the two FIFOs within certain limits set by a control circuit 131. The limits may be a preset condition or may be input by a end user. The TSI circuit 130 keeps the output from the color Z request FIFO 122 and the texture request FIFO 128 within these skew limits.

The output of color/Z pipeline 112 and texture pipeline 114 are input to a memory buffer, typically a regular FIFO 132. The regular FIFO 132 stores the information or data related to the color/Z operands and the information needed to retrieve texture operands. The TSI circuitry 130 determines the sequence of data stored in the regular FIFO 132 because the TSI circuit 130 determines when each request FIFO 122, 128 transmits data. Regular FIFO 132 has an output corresponding to a single channel 134. The single channel 134 couples the output of regular FIFO 132 to a memory 136, typically a dynamic random access memory (DRAM). Thus, regular FIFO 132 stores data corresponding to operands for generating a 3D image in the proper sequence for output to a memory device 136. In one embodiment, the data stored in regular FIFO 132 are addresses of operands in memory device 136.

FIG. 1B illustrates a flow of data from memory device 136 of FIG. 1A, through a series of data FIFOs 138, 140 and 142. Data FIFO 138 stores Z operands, data FIFO 140 stores color operands and data FIFO 142 stores texture operands. Texture operands stored in data FIFO 142 may undergo further processing in a texture filtering circuit 144 before being processed in a processing circuit or a color calculator blending circuit 146. The color calculator blending circuit 146 combines the Z data operands, the color operands and the texture operands to produce a color value for a pixel for output to an imaging device such as a video screen or a second memory storage device (not shown).

In a separate data stream, coefficients to the planar equations generated by set-up engine 116 are stored in planar coefficients FIFO 118. The coefficients are forwarded to an interpolator 119 which generates shading data for color blending circuit 146. Color blending circuit 146 typically needs all four operands, including shading, color, Z, and texture operands to properly output color data.

Figure 2:
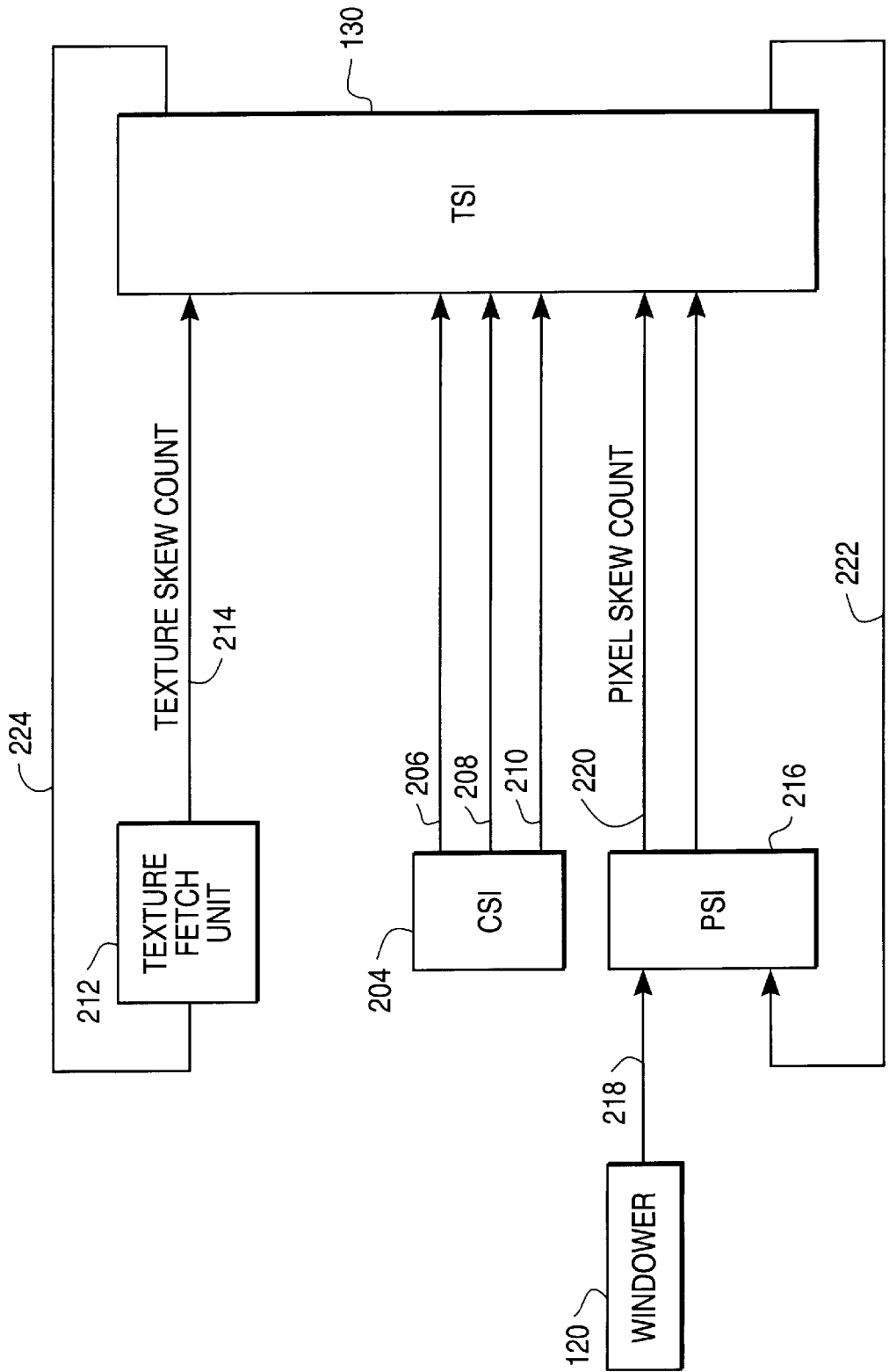
FIG. 2 illustrates the signals input and output by one embodiment of a texture stream interface (TSI) control circuit.

FIG. 2 illustrates the connections to one embodiment of a texture stream interface (TSI) circuit 130. Control circuit 132 uses a command stream interface (CSI) 204 to program skew limits into the TSI on lines 206 and 208. Typically, each pixel in an image corresponds to one color operand from the color/Z pipeline 112, one Z operand from the color/Z pipeline 112 and up to several texture operands from the texture pipeline 114. A first line 206 coupling the CSI 204 to the TSI 130 transmits a lower skew limit indicating the number of pixels by which the color/Z pipeline 112 can output corresponding color or Z operands before the system switches to requesting data from texture pipeline 114. Line 208 transmits upper skew limit indicating the number of pixels by which texture pipeline 114 outputs corresponding data before the system switches to requesting color and Z operands from color/Z pipeline 112. A third line 210 carries a disable signal which disables the TSI circuit when appropriate.

TSI 130 also receives signals from a texture fetch unit 212. In one embodiment, the texture fetch unit 212 is incorporated into texture request FIFO 128. The texture fetch unit transmits a texture skew count signal along line 214. The texture skew count signal includes a texture factor unit which communicates the number of texture operands corresponding to a particular pixel to the TSI circuit 130. Typical texture factor units range in value from zero to four. The texture skew count signal transmitted on line 214 also indicates to the TSI circuit 130 when a transfer of data occurs allowing TSI circuit 130 to count the number of texture operands transmitted from the texture request FIFO 128 of FIG. 1A.

TSI circuit 130 also receives signals from a pixel stream interface (PSI) circuit 216 of FIG. 2. In one embodiment, PSI circuit 216 is incorporated into the color/Z request FIFO 122 of FIG. 1A. The windower 120 indicates which pixels are to be processed via connection 218. PSI 216 notifies the TSI when a unit of data is transferred from the color/Z pipeline 112 to the regular FIFO 132 of FIG. 1A. The notification occurs along line 220 of FIG. 2. The notification allows the TSI circuit 130 to keep count of the data flowing from PSI circuit 216. When the TSI circuit 130 determines that a skew limit is reached, for example, the color/Z request FIFO 122 has transmitted sufficient data, a skew hold signal is transmitted along lines 222 to PSI circuit 216 to switch data flow from the color/Z request to a texture request. Line 224 is a similar connection which switches the texture fetch unit 212.

Figure 3:
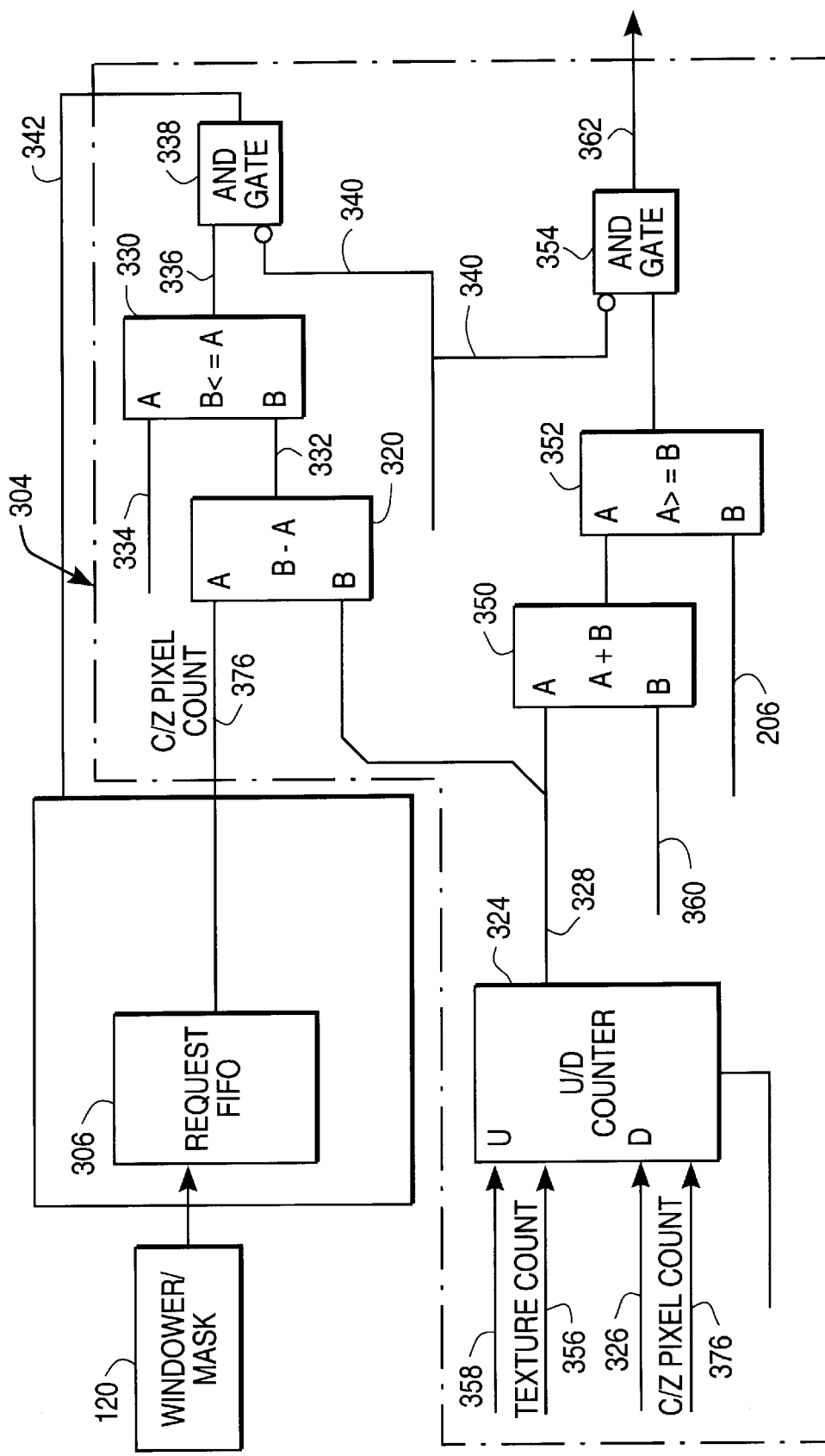
FIG. 3 illustrates one embodiment of the internal circuitry inside the TSI control circuit.

FIG. 3 illustrates one embodiment of the internal circuitry 304 inside a TSI circuit 130. Outside of the TSI circuit, a windower 120 transfers requests for color/Z operands to the pixel stream interface (PSI) 216. The incoming data is stored in the color/Z request FIFO 306. As each color operand and Z operand is output, information is also transmitted indicating the number of pixels that have been output by the request FIFO 306.

In the TSI circuit, a subtractor 320 subtracts the pixel count from the color/Z request FIFO 122 with the current skew count number on line 328. If comparator 330 determines that the result output by subtractor 320 is below the skew count limit on line 324, then comparator output 336 is combined with an enable signal on line 340 to generate a skew hold signal on line 340 which stops Z and color request information from being transferred. If comparator 330 indicates that the result output by subtractor 320 is within skew count limits, then the output from the PSI circuit 216 is input into an up/down counter 324 via line 326. An asserted line 326 causes the up/down counter 324 to count down by the number of pixels indicated on color/Z pixel count line 376. Thus, the distance the counter output is above or below a predetermined value (typically zero) indicates the skew of the system above or below the predetermined value. Thus, the up/down counter 324 outputs a current skew count signal on line 328.

The current skew count signal indicates either number of pixels in which the color/Z operands have been transmitted without a corresponding texture request operand or the number of pixels in which texture request operands have been transmitted without a corresponding color/Z operand. This skew value is input into a subtractor 320 which incorporates the number of newly transmitted color operands with the skew value and inputs the two values into a second comparator 330. Second comparator 330 compares the difference generated in subtractor 320 on line 332 with a lower limit input on line 334. The lower limit indicates the minimum skew in a first direction.

As long as the output of subtractor 320 is less than the lower limit input on line 334 comparator 330 outputs a continue signal on comparator output 336. This signal is received by AND gate 338. AND gate 338 combines the output of comparator 336 with a circuit disable signal or enable signal input on enable line 340. When enable line 340 indicates an enable signal and the skew lower limit has not been reached, AND gate 338 outputs a continue signal allowing skew hold output on line 342 not to be asserted and the system to continue outputting color and Z operands from the color/Z request FIFO 306. This process continues until comparator 330 determines that the pixel count from comparator 320 reaches or exceeds the lower limit 334. When the skew limit is reached, comparator 330 outputs a hold signal causing AND gate 338 to output a hold signal on line 342 resulting in a stop to output color and Z operands and to start outputting texture operands.

A similar arrangement of adders 350, comparators 352 and AND gate 354 monitor the outputs from texture request FIFO 128. In particular, the texture fetch unit outputs a skew count into the up/down counter 324 along line 356. When the pixel corresponding to the texture operands are being counted, the up/down counter 324 counts up because the up input is asserted on line 358 by the TSI logic circuitry. The result is a generation of the current skew count which is output on line 328. Up/down counter 324 counts up as texture operands corresponding to a pixel are output. Adder 350 adds the current skew count output to the number of pixels corresponding to transmitted texture operands from the texture fetch unit 212 along line 360. Comparator 352 compares the upper limit of the skew count received on line 206 from CSI 204 with output of adder 350. AND gate 354 monitors the output of comparator 352 and a disable signal from line 340. When appropriate a hold signal is output by AND gate 354 along line 362 when the AB comparator 352 indicates that the skew equals or exceeds the upper limit and the disable signal has not been asserted.

FIG. 4 illustrates at a conceptual level the operation of the TSI circuit. For convenience, all texture operands that correspond to one particular pixel will be called a texel. Thus, four pixels which may correspond to 11 texture operands will make up four texels. The diagram of FIG. 4 illustrates the difference or "skew" between the texels and Z or color operands output by a system of the present invention. The origin of the diagram of FIG. 4 is set where the number of color or Z operands corresponding to a pixel and the number of texels output are equal. This origin is conceptually represented as a zero line 404. The skew is represented by the distance that the system is from the zero line 404. Thus as time goes forward, the system oscillates between the texel boundary 408 (or upper skew limit) at a upper limit and a pixel boundary 412 (or lower skew limit) at a lower limit.

As time goes forward, the increase of line segment 416 shows a period during which the system outputs texture operands or texels in texel fetch operations. Once the system hits the upper limit for texel outputs 408 (typically about seven texels) the system switches and begins outputting color and Z operands corresponding to color or Z fetches along line segment 420. The system continues the fetching of color and Z operands until the pixel lower limit 412 is reached at which point the system again begins retrieving texels in line segment 424.

The system may also be optimized to switch between retrieval of texels and color or Z operands before reaching the skew limits or texel boundary 408 and pixel boundary 412 under certain circumstances. These circumstances include when a texel or pixel is the last pixel of a polygon, the system may automatically switch to retrieving the other type of operand to move the system towards the zero line 404. Performance may also be enhanced by checking if either the texture request buffers, or FIFOs 122, 128 are empty. If a FIFO is empty, the system will automatically start retrieving data from the other FIFO.

Levels 408, 412 which represent skew limits are determined by the size of data buffers which store operands generated by the operand requests. The level settings are designed to prevent a stream of data of one data type from fetching too far ahead of fetches from a stream of data of a second data type. When one data stream fetches too far ahead of a second data stream, a deadlock condition may occur. A deadlock condition occurs when a stream of one data type fills all the available storage in the data buffer preventing fetches of the second data type in the second data stream. Because some processing devices, such as color calculator blender 146, needs access to both operand types to generate data for a particular output, such as a pixel color, the processing unit cannot continue processing data. Instead the processing unit waits for the missing operands resulting in a deadlock condition.

Figure 5:
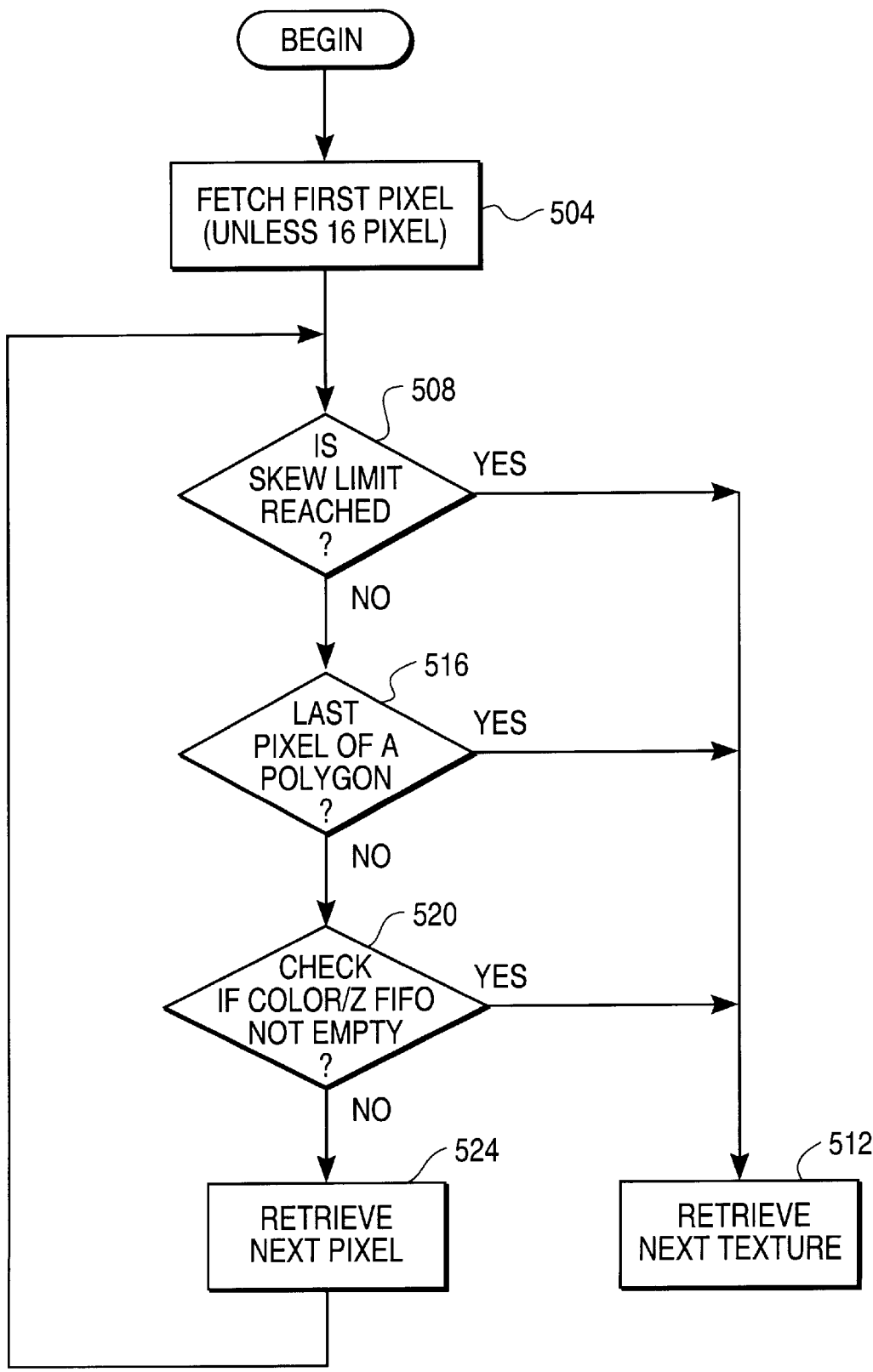
FIG. 5 is a flow diagram illustrating the operation of the system to switch among various fetches.

FIG. 5 is a flow diagram illustrating the operation of the system to toggle between various fetches. In FIG. 5, a color or Z operand corresponding to a pixel is fetched in step 504 (for convenience, further description will describe a color operand). The TSI determines whether the skew limits have been reached in step 508. The skew limit may be either the pixel or the texel skew limit indicating that the system should switch to retrieving another operand type. If the skew limit has been reached, the system retrieves the next operand of an opposite data type or a texel operand in step 512. (Texels and color/Z operands corresponding to pixels are opposite data types.)

When a skew limit has not been reached, the TSI determines whether the color operand retrieved corresponds to the last pixel of a polygon in step 516. If the last operand fetched corresponds to the last pixel of a polygon, the system retrieves a texture operand in step 512. Otherwise, the TSI checks to make sure that the color/Z request FIFO 122 is empty in step 520. If the request FIFO is empty, the system retrieves the next texture operand in step 512. Otherwise, the system retrieves the next color or Z operand corresponding to the next pixel in step 524 and then loops back and repeats the process. The process continues until the system toggles and starts retrieving texel operands in step 512.

After switching, the system goes through a similar set of tests checking each texel to see whether a texel 1) causes the system to reach the skew limit, 2) whether the texel is the last texel of a polygon and 3) checking to make sure that the texel FIFO is not empty. The system continues to retrieve texels as long as all the conditions are met. Once one condition is not met, the system will again begin retrieving or fetching color or Z operands corresponding to pixels.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A system for transferring three-dimensional data comprising:
   a first memory device to store color data, each unit of color data corresponding to a pixel in a plurality of pixels;
   a second memory device to store texture data, each unit of texture data corresponding to a pixel in the plurality of pixels;
   a skew control circuit to control the flow of data from the first memory device and from the second memory device into a single pipeline, said skew control circuit to maintain the skew of color data with respect to texture data within predetermined skew limits.

2. The system of claim 1 wherein said first memory device is configured to store Z data as well as color data.

3. The system of claim 1 wherein the predetermined skew limits are based on a number of pixels.

4. The system of claim 3 wherein the texture data includes texture operands, each pixel of a digital image corresponding to a number of texture operands.

5. The system of claim 1 wherein the pipeline is a data request pipeline.

6. A method of maintaining the data skew of texture data and color data within predetermined limits comprising the steps of:
   fetching a unit of color data into a channel, the unit of color data corresponding to a pixel;
   determining if a skew limit is reached; and
   fetching a unit of texture data corresponding to the pixel into the channel after the skew limit has been reached.

7. The method of claim 6 further comprising the step of:
   fetching a unit of Z data corresponding to the pixel into the channel before the determining step determines that the skew limit has been reached.

8. The method of claim 6 wherein the determining step further comprises the steps of:
   incrementing a number corresponding to the fetching of the unit of the color data into the channel; and
   comparing the number with the skew limit.

9. The method of claim 8 further comprising the step of subtracting from the number of color operands the number of pixels corresponding to texture operands which have been output by a second memory device.

10. The method of claim 6 further comprising the steps of:
    fetching additional units of texture data corresponding to a plurality of pixels;
    determining when a second skew limit is reached; and
    fetching a second unit of color data into the channel after determining the second skew limit is reached.

11. The method of claim 10 wherein the determining of when the second skew limit is reached further comprises the steps of:
    counting the number of texels output from a device; and
    comparing the number with the second skew limit.

12. A circuit for controlling and directing two streams of 3-D data comprising:
    a device to count the number of data units of a first data type corresponding to pixels transferred from a first memory device; and
    a comparison circuit comparing the output of the device with a skew limit.

13. The circuit of claim 12 wherein the device counts in an opposite direction when data units of a second data type corresponding to pixels are transferred from a second memory device.

14. The circuit of claim 13 further comprising:
    a second comparison circuit for comparing the output of the device with a second skew limit.

15. The circuit of claim 12 wherein the device is an up/down counter.

* * * * *